(12) United States Patent
Osa

(10) Patent No.: US 6,938,105 B2
(45) Date of Patent: Aug. 30, 2005

(54) DATA APPARATUS AND METHOD HAVING DMA CIRCUITRY TO EFFICIENTLY TRANSFER MULTIVALUED BIT-PLANE DATA

(75) Inventor: Kinya Osa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 421 days.

(21) Appl. No.: 09/983,101

(22) Filed: Oct. 23, 2001

(65) Prior Publication Data

US 2002/0057276 A1 May 16, 2002

(30) Foreign Application Priority Data

Oct. 27, 2000 (JP) ........................................ 2000-329421
Sep. 27, 2001 (JP) ........................................ 2001-297445

(51) Int. Cl.[7] ............................................. G06F 13/28
(52) U.S. Cl. ............................ 710/22; 710/20; 710/23; 710/24; 710/31; 710/55; 712/225; 382/8; 382/46; 382/240; 382/247
(58) Field of Search ............................. 710/20, 22, 23, 710/24, 31, 55, 225; 382/8, 46, 240, 247

(56) References Cited

U.S. PATENT DOCUMENTS

| 4,627,097 | A | * | 12/1986 | Finlay et al. .................. 382/46 |
|---|---|---|---|---|
| 5,247,626 | A | * | 9/1993 | Firoozmand ................. 395/250 |
| 5,379,348 | A | * | 1/1995 | Watanabe et al. ............... 382/8 |
| 6,072,909 | A | * | 6/2000 | Yokose et al. ............... 382/247 |
| 6,195,465 | B1 | | 2/2001 | Zandi et al. ................. 382/695 |
| 6,473,530 | B2 | * | 10/2002 | Nakayama ................... 382/238 |
| 6,546,143 | B1 | * | 4/2003 | Taubman et al. ........... 382/240 |
| 6,658,159 | B1 | * | 12/2003 | Taubman .................... 382/240 |
| 6,778,709 | B1 | * | 8/2004 | Taubman .................... 382/240 |

FOREIGN PATENT DOCUMENTS

| JP | 08-149308 | 6/1996 |
|---|---|---|
| JP | 09-27752 | 1/1997 |

* cited by examiner

Primary Examiner—Jeffrey Gaffin
Assistant Examiner—Justin Knapp
(74) Attorney, Agent, or Firm—Fitzpatrick, Cella, Harper & Scinto

(57) ABSTRACT

A data processing apparatus improves speed and efficiency of transfer of bit data, especially, multivalue data bit plane. For this purpose, a memory 50 holds four 8-bit multivalue data per 1 word, and bit plane coding processing is made by 4×4 (=16) multivalue data (processing block). In a memory area 51, the most significant bit (bit 7) of respective multivalue data (data 0 to 15 in FIG. 5) is collected in the order of multivalue data, and stored in one position (hatched portions in FIG. 5). Similarly, bit 6 is collected from the respective multivalue data and stored in one position.

9 Claims, 15 Drawing Sheets

FIG. 6
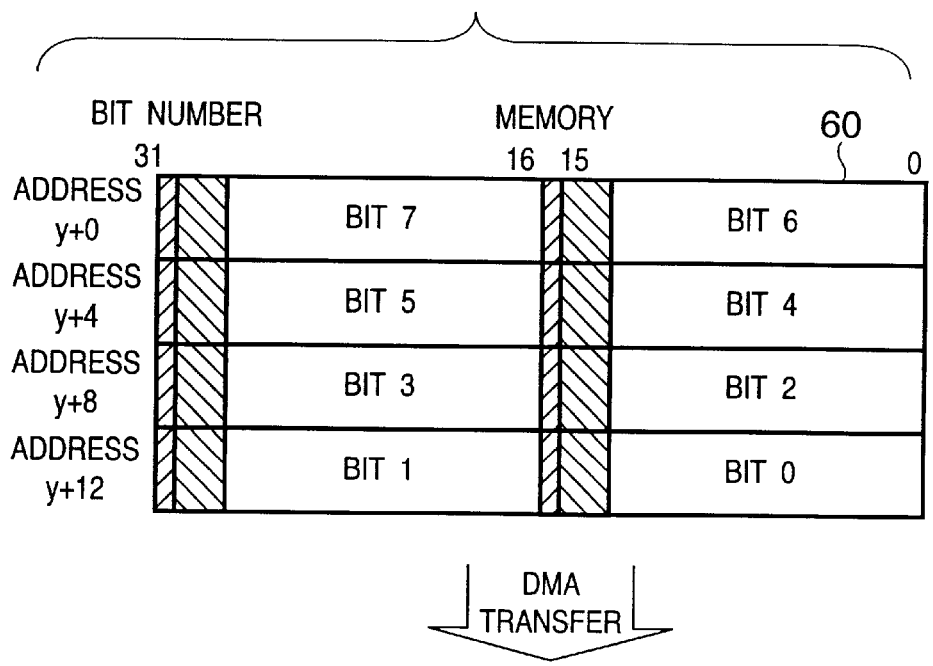
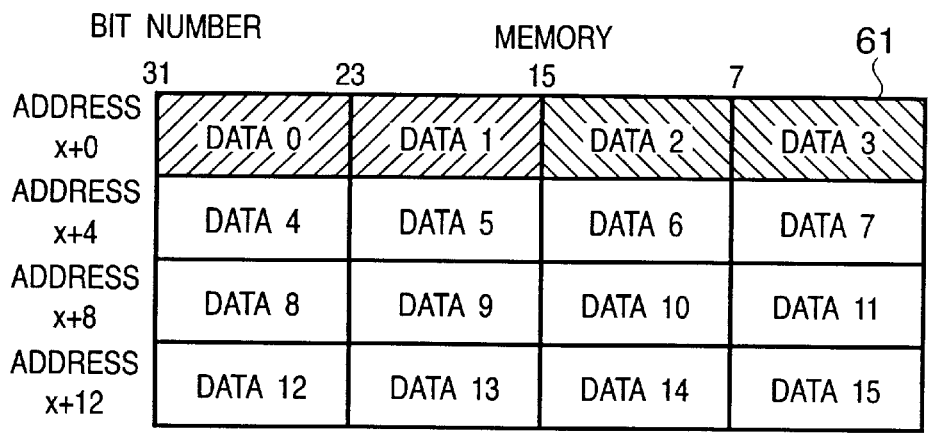

FIG. 15
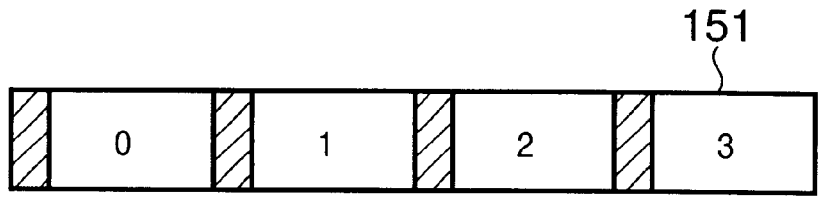
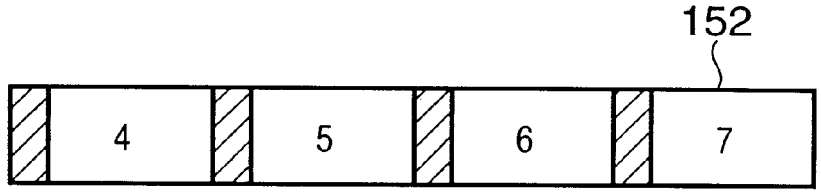
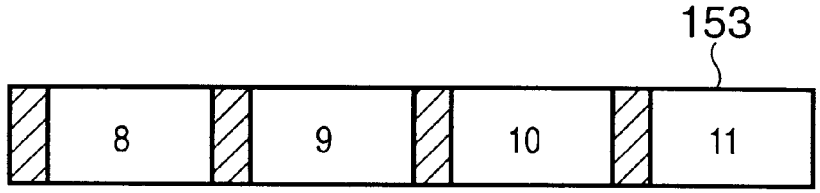
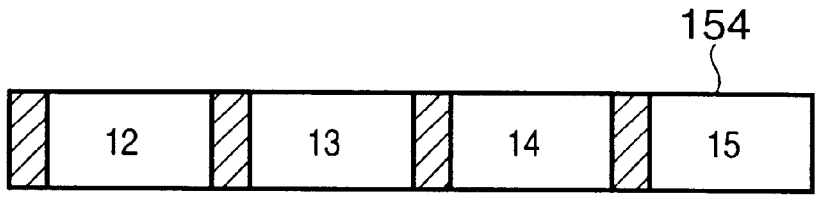
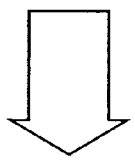
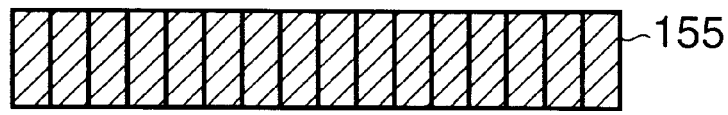

DATA APPARATUS AND METHOD HAVING DMA CIRCUITRY TO EFFICIENTLY TRANSFER MULTIVALUED BIT-PLANE DATA

FIELD OF THE INVENTION

The present invention relates to a data processing apparatus for data transfer between predetermined memories, a processor for loading data from a predetermined memory to a predetermined register, and a control method for the data processing apparatus and the processor.

BACKGROUND OF THE INVENTION

As disclosed in Japanese Published Unexamined Patent Application Nos. Hei 08-149308 and Hei 09-027752, an image coding method for bit plane coding (entropy coding in bit-plane units) wavelet-transformed coefficient values has been proposed, and this method is adopted in the JPEG 2000 coding system being standardized by the ISO.

FIG. 2 shows a generalized flow of processing by the image coding system. In FIG. 2, an input pixel value is a multivalue data where each pixel value is represented by plural bits. If the value 20 is transform-encoded (21) by wavelet transform (or other transform-coding method such as DCT), the output becomes a coefficient value (22). The coefficient value 22 is also multivalue data. Although omitted in this figure, the coefficient value 22 may be quantized in accordance with necessity. Next, the coefficient value 22 (or quantized value) is entropy-encoded (23) in bit plane units, and coded data (24) is obtained.

In the bit plane coding, as multivalue data as an input must be processed in bit plane units, processing to divide the input multivalue data array into individual bit planes is logically required. FIG. 3 shows an example of processing to divide an array 30 of 4×4 4-bit coefficient value into bit planes 31 to 34.

Next, actual execution of bit plane coding on multivalue data, which has been read from a memory (into a register) by a coding processor, will be considered.

In this example, a data bus width of the memory is w bits, a bit width (depth) of the multivalue data is d bits, and d-bit multivalue data are stored on the memory without any gap.

When the coding processor directly loads the data into the memory, w-bit data read by one loading includes w/d multivalue data of d-bit. In only one bit plane of interest, only w/d bits from the bit plane are included, and if this bit plane is subjected to the following processing, the remaining (w−w/d) bits are wasteful bits. Accordingly, to perform bit plane coding processing on one bit plane, it is necessary to repeat loading of bit plane and to mask unnecessary bits to extract necessary bits.

FIG. 4 shows an example in the above-described coding processing where a register width of the coding processor (1 word) is 32 bits, the memory data bus width is 32 bits, and the multivalue data bit width is 8 bits. 8-bit multivalue data, more specifically, four multivalue data per 1 word, are stored in a memory 40, and 4×4 (=16) multivalue data construct one processing unit of bit plane coding. If a bit plane constructed with most significant bits (hatched portion in FIG. 4) of the multivalue data is subjected to bit plane coding, first, to load the four most significant bits 31, 23, 15 and 7 of data 0 to 3 into a register 41, 1-word load processing to load 1 word from an address 0 of the memory 40 is performed.

At this time, among the loaded data 0 to 3, only the above-described 4 bits are necessary but the other bit data are unnecessary for bit plane coding. Accordingly, to specify necessary bits, it is necessary to perform bit mask processing on the register 41 and extract necessary bits. Next, the load processing is performed to load the most significant bits of data 4 to 7, from an address 4 of the memory 40, and further, the load processing is performed to load the remaining bits in the currently-processed block from an address 8 of the memory 40, then from an address 12 of the memory 40. Thus the load processing must be performed 4 times in the entire processing block.

Further, when the bit plane of most significant bits has been processed and the process proceeds to the next bit plane, the load processing is performed 4 times and the bit mask processing is performed on the register 41, so as to extract necessary bits, as in the case of the bit plane of most significant bits. This processing is repeated to all the bit planes (8 bit planes in FIG. 3).

The conventional coding processing as described in the above example requires the coding processor to issue a large number of load instructions and perform mask processing many times, which disturbs improvement in efficiency and speed of the bit plane coding processing. Further, even if the above processing is realized by software, the result of processing is the same.

On the other hand, in the above-described Japanese Published Unexamined Patent Application Nos. Hei 08-149308 and Hei 09-027752, logical algorithms of bit plane coding are described, however, particular methods of realizing the coding are not described.

SUMMARY OF THE INVENTION

The present invention has been made in view of the above problems, and has its object to improve the speed and efficiency of transfer of bit planes of bit data, especially multivalue data.

To attain the foregoing object, a data processing apparatus of the present invention has the following construction. That is, provided is a data processing apparatus for data transfer between predetermined memories, wherein plural multivalue data including plural bits exist in a first memory, and wherein a group of bit plane data including bits belonging to the same bit plane is transferred from the plural multivalue data, in bit plane data units, to a second memory.

Further, to attain the foregoing object, the data processing apparatus of the present invention has the following construction. That is, provided is a data processing apparatus for data transfer between predetermined memories, wherein plural bit plane data groups exist, and wherein multivalue data is generated by selecting bit data belonging to the same multivalue data, from the respective bit plane data groups, in a predetermined order.

Further, to attain the foregoing object, a processor of the present invention has the following construction. That is, provided is a processor for oading data from a predetermined memory to a predetermined register, wherein plural multivalue data including plural bits exist in the predetermined memory, and wherein a group of bit plane data including bits belonging to the same bit plane is transferred from the plural multivalue data, in bit plane data units, to the predetermined register.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is an explanatory view of processing performed by the DMA circuit according to a second embodiment of the present invention upon generation of multivalue data from bit plane data;

FIG. 15 is an explanatory view of example to which the embodiment of the present invention are applied to step S104 in FIG. 10.

DETAILED DESCRIPTION OF THE PREFERRED EMBODIMENTS

Preferred embodiments of the present invention will now be described in detail in accordance with the accompanying drawings.

[First Embodiment]

In the present embodiment, a DMA circuit having a multivalue data bit plane data conversion function is used. On a memory holding input data (multivalue data to be subjected to bit plane coding), the multivalue data is converted to bit plane data before a coding processor for bit plane coding accesses the input data.

Figure 4:
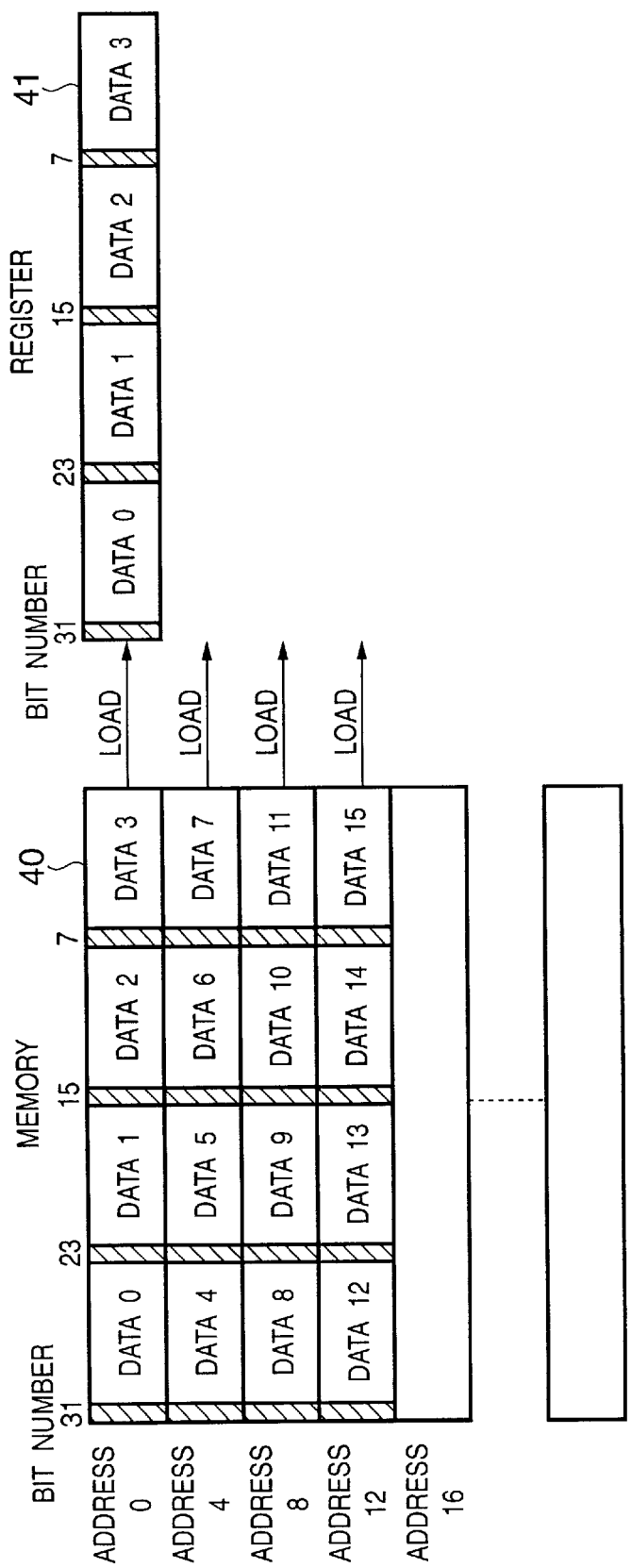
FIG. 4 is an explanatory view of the conventional coding processing in which the register width of coding processor (1 word) is 32 bits, the memory data bus width W is 32 bits, and the multivalue data bit width d is 8 bits.
Figure 5:
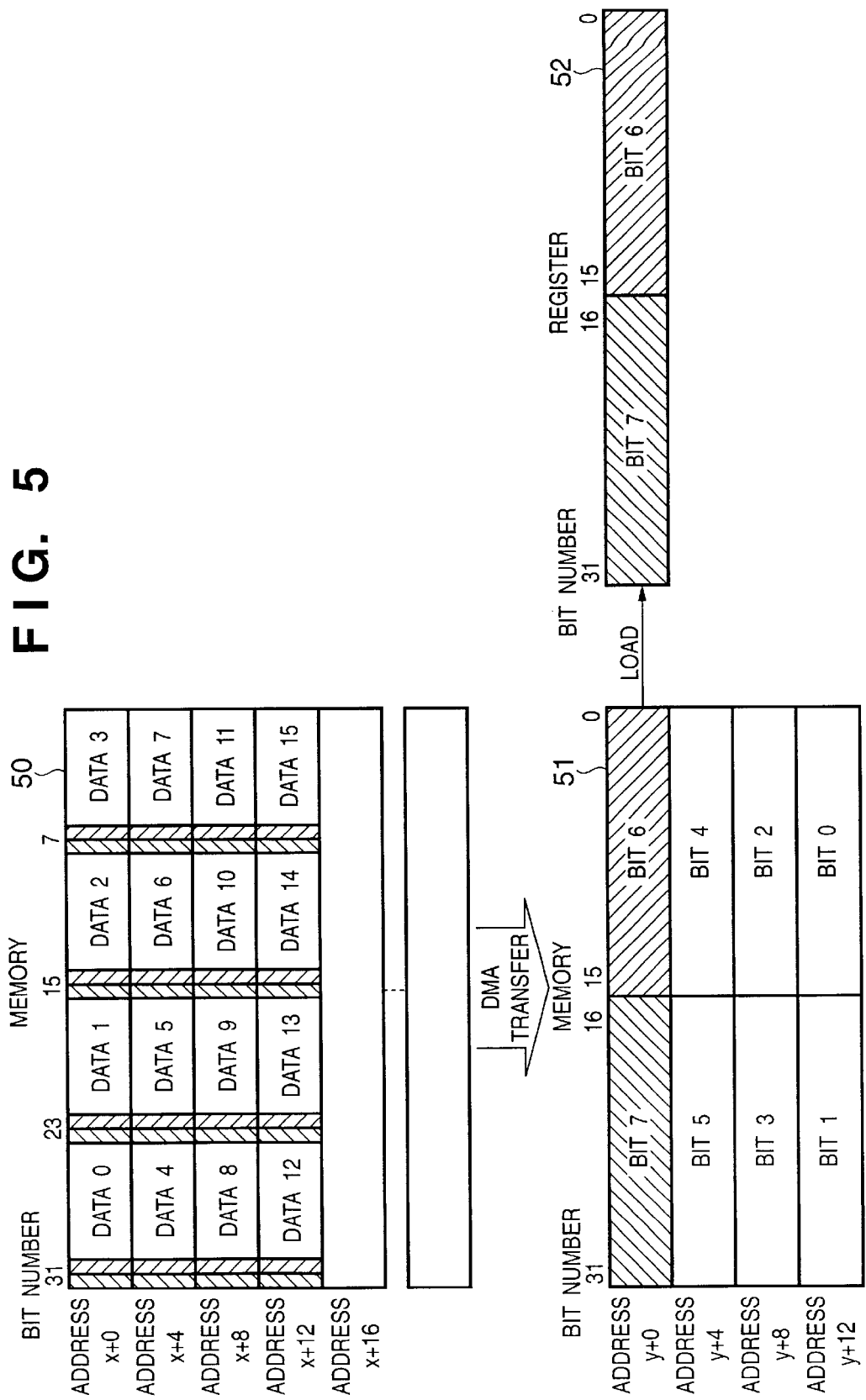
FIG. 5 is an explanatory view of processing performed by the DMA circuit in the first embodiment of the present invention.

FIG. 5 shows processing performed by the DMA circuit of the present embodiment. The array of multivalue data on a memory 50 is the same as the multivalue data array as shown in FIG. 4. The DMA circuit of the present embodiment transfers data to another area 51 on the memory 50 (it is not necessarily on the same physical memory but may be on another memory), and upon transfer, performs conversion from multivalue data format to bit plane data.

In the memory area 51, the most significant bit (bit 7) of respective multivalue data (data 0 to data 15 in FIG. 5) is collected in the order of respective multivalue data (e.g., data 0, data 1, data 2, . . . ) and as represented as a hatched portion, stored in one position. Also a bit 6 is stored in the same manner. As the respective bits are stored into the memory in this manner, the coding processor obtains all the data of required bit plane (all the data for 2 bit planes (bits 7 and 6) here) by load processing once. Accordingly, the overhead of processing by the coding processor discussed as a problem in FIG. 4 can be reduced. Further, as shown in a register 52, as required bit plane data can be obtained in the form of one data set, coefficient values of neighboring pixels in the same bit plane can be obtained at once, and entropy coding using coefficient values of neighboring pixels, used in the JPEG 2000 system or the like can be efficiently realized.

In this embodiment, even though the load on the coding processor is reduced by introduction of the DMA circuit, the overhead of DMA transfer is added. However, the efficiency and speed of processing on the entire system (e.g. image coding system using bit plane coding) can be improved by performing other processing by the coding processor such that it overlaps with the DMA transfer. At this time, the DMA circuit is realized as a hardware circuit to perform DMA transfer between memory areas in the system.

Figure 1:
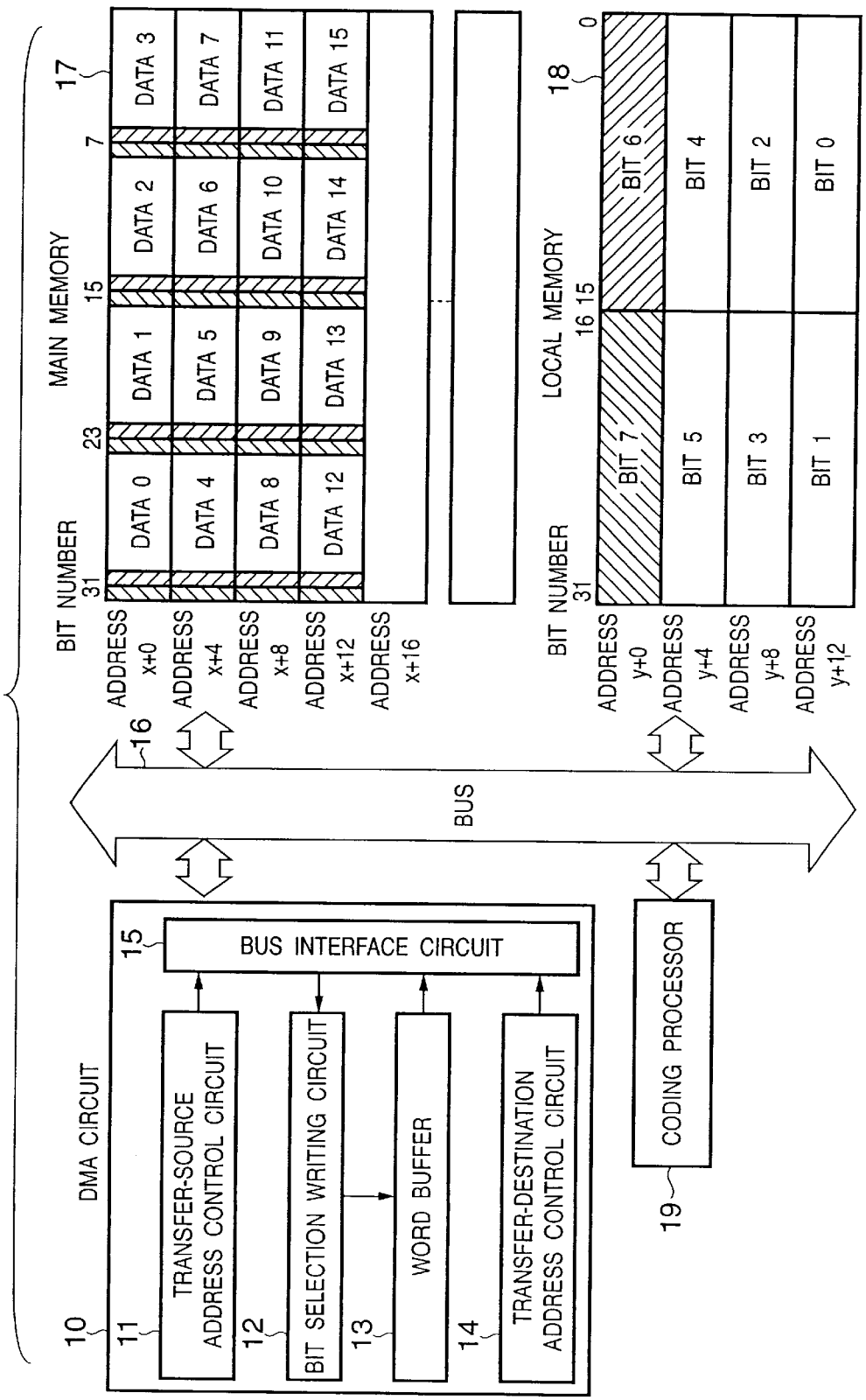
FIG. 1 is a block diagram showing a schematic construction of a DMA circuit according to a first embodiment of the present invention and a schematic configuration of a coding system including the DMA circuit.

FIG. 1 shows a schematic construction of a DMA circuit according to a first embodiment of the present invention and a schematic configuration of a coding system including the DMA circuit.

In FIG. 1, upon bit plane coding on a main memory 17, multivalue data as input data are stored in the same format as that shown in FIGS. 4 and 5. A DMA circuit 10 transfers the multivalue data while performing data transform, from the main memory 17 to a local memory 18 for a coding processor 19. The DMA data transfer is made via a bus 16, which is simply represented as a single bus in the figure but is not necessarily a single bus. (The main memory, the local memory and the coding processor may be positioned on separate busses. Further, if the system has only one main memory, the main memory 17 and the local memory 18 exist on the main memory.)

The data transform from the main memory 17 to the local memory 18 is made in the same manner as that shown in FIG. 5. The coding processor 19 loads bit plane data stored in the local memory 18, and performs bit plane coding.

As shown in FIG. 1, the DMA circuit 10 has 5 circuits, a transfer-source address control circuit 11, a bit selection writing circuit 12, a word buffer 13, a transfer-destination address control circuit 14, and a bus interface circuit 15.

The transfer-source address control circuit 11 controls a transfer-source address of DMA transfer. Generally, to fill the word buffer 13 with data for one data transfer to a transfer destination, the transfer-source address control circuit 11 issues a load instruction to the main memory 17 plural times. In FIG. 1, to fill the word buffer 13 with data to be stored into an address (y+0) of the local memory 18, 4-word data in addresses (x+0), (x+4), (x+8) and (x+12) of the main memory 17 are required. The transfer-source address control circuit 11 issues the load instruction to the main memory 17 4 times.

The bit selection writing circuit 12 selects and reads bits corresponding to a necessary bit plane from the data for a transfer-source data width, obtained by the transfer-source address control circuit 11, and writes the values of the selected bits into the word buffer 13.

More particularly, the processing performed by the bit selection writing circuit 12 will be described about an example where the word buffer 13 is filled with data stored in the address (y+0) of the local memory 18. First, data (data 0 to 3) in the address (x+0) of the main memory 17 are read, and a bit plane to be stored into the address (y+0) of the local memory 18, i.e., the bit 7 and bit 6 of the respective multivalue data (data 0 to 3) are extracted by the bit selection writing circuit 12, and the bit 6 and bit 7 of the respective multivalue data are respectively collected and stored into the word buffer 13. Next, data in the address (x+4) of the main memory 17 are read, and the bit 6 and bit 7 of the respective multivalue data are extracted by the bit selection writing circuit 12, and the bit 6 and bit 7 of the respective multivalue data are respectively collected and stored into the word buffer 13, next to the bit group previously loaded from the address (x+0). The processing is repeated on the addresses (x+8) and (x+12) of the main memory 17, and upon completion of the processing on the address (x+12) of the main memory 17, values to be written into the address (y+0) of the local memory 18 have been stored in the word buffer 13.

The word buffer 13 is a data buffer having a data bus width of the transfer destination (local memory 18). The word buffer 13 holds bits collected by loading from the transfer-source device (main memory 17). When plural times of loading from the transfer-source has been completed, the word buffer 13 holds data to be stored into the transfer destination (local memory 18).

The transfer-destination address control circuit 14 controls address of transfer destination for data stored in the word buffer 13. When the transfer-source address control circuit 11 has issued the load instruction 4 times to the addresses (x+0), (x+4), (x+8) and (x+12), and data to be stored into the transfer destination (local memory 18) have been stored in the word buffer 13, the transfer-destination address control circuit 14 issues a write instruction to the address (y+0).

The bus interface circuit 15 controls access timing by the DMA circuit 10 to the bus 16. The bus interface circuit 15 executes actual data transfer on the bus, in accordance with requests from the transfer-source address control circuit 11 and the transfer-destination address control circuit 14.

Figure 3:
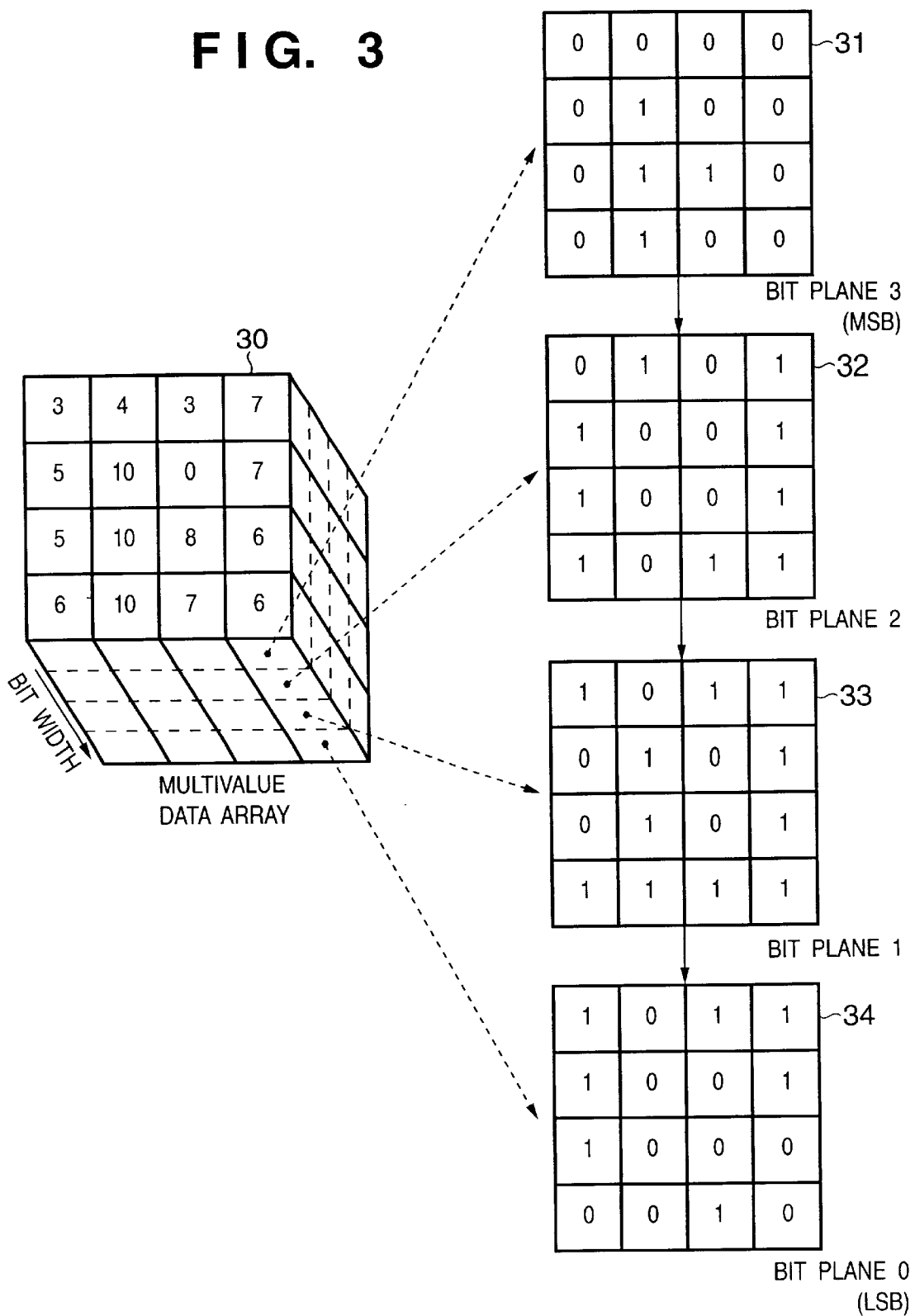
FIG. 3 is an explanatory view of processing to divide the 4×4 4-bit coefficient value array 30 into four bit planes 31 to 34.

In FIG. 1, the same parameters as those assumed in the example of FIGS. 3 and 4 (32 bits as the memory bus width, 8 bits as the multivalue data bit width and the like) are used. However, the DMA circuit 10 may be constructed to handle various memory bus width, various multivalue data formats and various multivalue data processing units (processing block sizes) by setting control method of the transfer-source address control circuit 11, the way of bit selection by the bit selection writing circuit 12, the way of bit writing into the local memory 18 and the like, as variable parameters.

As described above, as the DMA circuit and the DMA transfer method in the present embodiment, a bit group data per each bit constructing multivalue data is generated from the respective multivalue data stored in a main memory and the generated data is stored into the local memory by each bit group data, thereby all the data of a necessary bit plane can be obtained by one load processing. Thus the bit plane coding processing can be simplified, and processing time can be reduced.

[Second Embodiment]

The DMA circuit in the first embodiment is used in bit plane coding processing, however, the DMA circuit can be also used in bit plane decoding processing. In the present embodiment, the decoding processing in a decoding system using the DMA circuit will be described.

Figure 2:
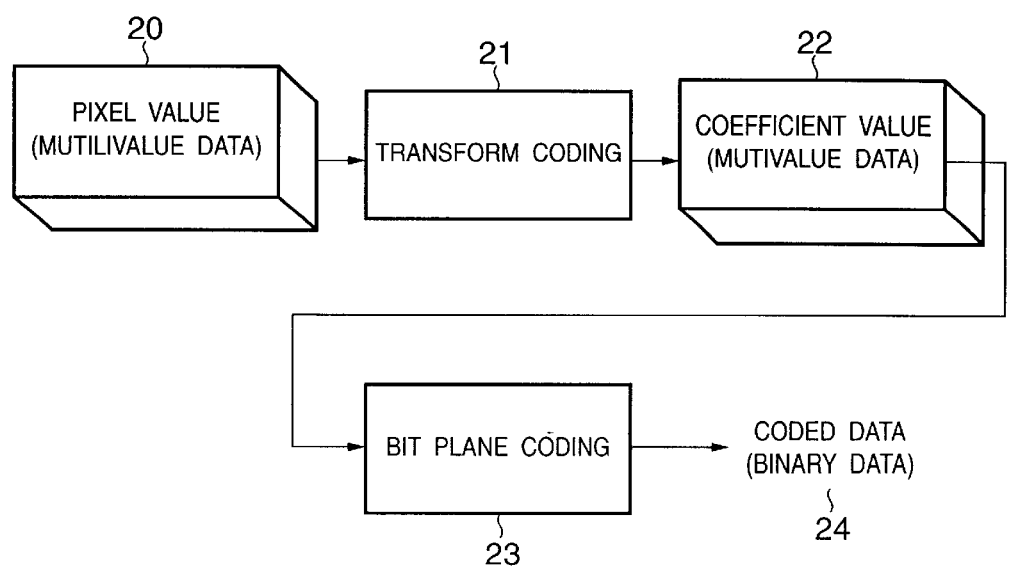
FIG. 2 is a block diagram showing the flow of generalized image processing by a bit plane coding method.

Generally, the bit plane decoding processing is processing along the flow of data as shown in FIG. 2 in reverse order. That is, coded data is first subjected to bit plane decoding, thereby bit plane data is generated. As the bit plane data has been obtained by decoding in bit plane units, it is necessary to convert the data to a multivalue data array. When the multivalue data array is obtained, inverse transform coding is performed (with inverse quantization if necessary), and an original pixel value can be reproduced. In this series of decoding, when the multivalue data is generated from the generated bit plane data, the above-described DMA circuit can be used.

As shown in FIG. 6, the data immediately after the bit plane decoding is stored, in bit plane units, in a memory 60. FIG. 6 shows processing performed by the DMA circuit according to the present embodiment upon generation of multivalue data from bit plane data.

As shown in FIG. 6, the bit plane data can be rearranged to the multivalue data array by collecting bits corresponding to specific positions in respective bit planes, in correspondence with the bit depths of multivalue data, based on the bit plane data for respective bit planes stored in the memory 60.

In the example of FIG. 6, the transform operation by the DMA circuit upon decoding will be described. Data of bit (plane) 7 and bit (plane) 6 exist in an address (y+0) of the memory 60, and the DMA circuit loads the bit 7 and bit 6 data. As four multivalue data (data 0 to 3) are collected and stored into an address (x+0) of a transfer destination memory 61, data corresponding to the multivalue data 0 to 3 (bit numbers 31 to 28 in bit 7, and bit numbers 15 to 12 in bit 6) are extracted from the data loaded form the address (y+0), and written into the word buffer 13, by the bit selection writing circuit 12. This operation is repeated for addresses (y+4), (y+8) and (y+12). As a result, data are written from most significant bits of the respective data 0 to 3 into the buffer 13, and finally, the respective data 0 to 3 are reproduced in the buffer.

As data to be stored into the address (x+0) of the memory area 61 are stored in the word buffer 13 upon completion of processing for the address (y+12), the data (data 0 to 3) stored in the word buffer 13 are stored into the address (x+0). Then, the same processing is repeated for addresses (x+4), (x+8) and (x+12) of the memory area 61, and finally, the 4×4 multivalue data array is generated.

As described above, the DMA circuit and its method reproduce multivalue data from bit plane data.

[Third Embodiment]

In the present embodiment, processing upon loading bits included in respective bit planes from a memory holding plural multivalue data into a register will be described.

Further, in the present embodiment, the processing by the bit selection writing circuit 12 as described in the first embodiment (i.e., selecting and extracting bits corresponding to a necessary bit plane from data of the transfer-destination-data width, obtained by the transfer-source address control circuit 11) is included, with processing of loading to the register, into a function of a processor (CPU, DSP or the like) as a bit selection load instruction. The processor selects data of necessary bit plane and loads the data to the register at the same time of loading of multivalue data from the memory. Otherwise, the load processing of bit plane data to the register may be performed by the DMA circuit in the first embodiment.

Figure 7:
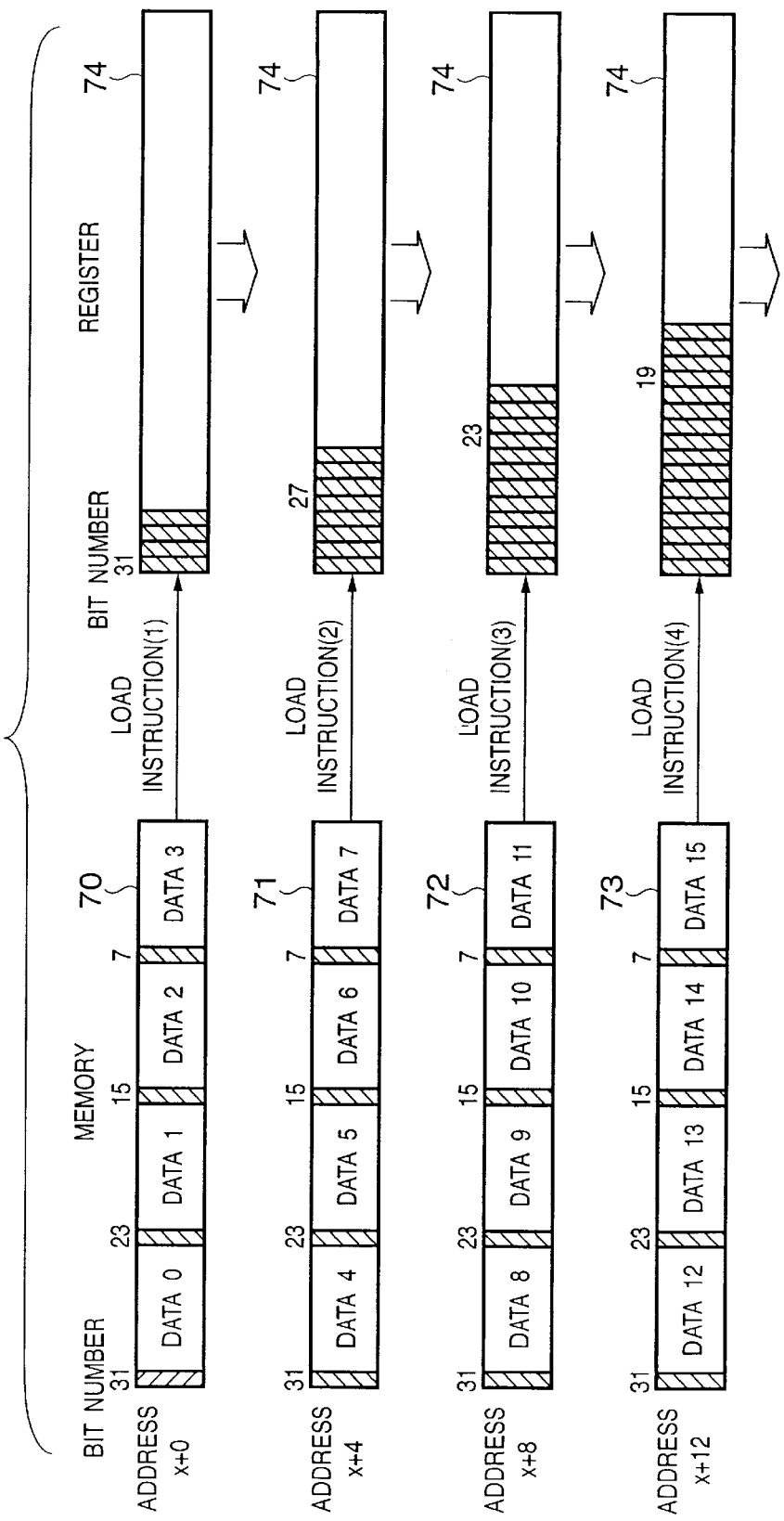
FIG. 7 is an explanatory view of data processing in use of bit selection load instruction.

FIG. 7 shows data processing by using the above-described bit selection load instruction in a case where the same parameters as those assumed in the example of FIGS. 3 and 4 (32 bits as the memory bus width, 8 bits as the multivalue data bit width and the like) are used. The arrangement of multivalue data on memories 70 to 73 is the same as that in the first and second embodiments. In FIG. 7, the most significant bit plane is treated as a bit plane of interest, and bits of the most significant bit plane are hatched as in the case of the first and second embodiments.

When the most significant bit plane is designated and the first bit selection load instruction is executed, data for 1 word are read from the memory 70, then only bits of the most significant bit plane are selected and collected, and written into bit positions specified by bit numbers 31, 30, 29 and 28 of register 74. Similarly, the second bit selection load instruction is executed for the memory 71 and the register 74. Note that at this time, writing positions for bits of the bit plane are shifted from those of the first time, to bit positions specified by a bit number 27, thereby bits of the most significant bit plane selected from bit planes read from the memory 71 are written into bit positions specified by bit numbers 27, 26, 25 and 24 of the resister 74. Then similarly, the third and fourth bit selection load instructions are executed, while memory addresses are shifted, using the same register. Thus, finally, all the 16 bit data corresponding to the most significant bit plane are arranged as a data group on one register.

As a result, the number of reading times from the memories (70 to 73) in use of normal load instruction is the same as that in use of the above-described bit selection load instruction, however, since data read from the memories (70 to 73) are subjected to bit plane coding at the next step, the efficiency of use of bits in the register on the processor is higher and consumption of register for bit plane data storage is smaller in the processing using the bit selection load instruction. Further, in the normal load instruction, bits of bit plane of interest are scattered in the register after execution of load instruction, and a complicated bit mask processing is required, however, in the register after execution of the bit selection load instruction, as bits of bit plane of interest are arranged as a data group as in the register 52 in FIG. 5, bit mask processing can be easily performed. Further, it may be arranged such that necessary bits are extracted as carry bits by shift operation without bit mask processing.

Figure 8:
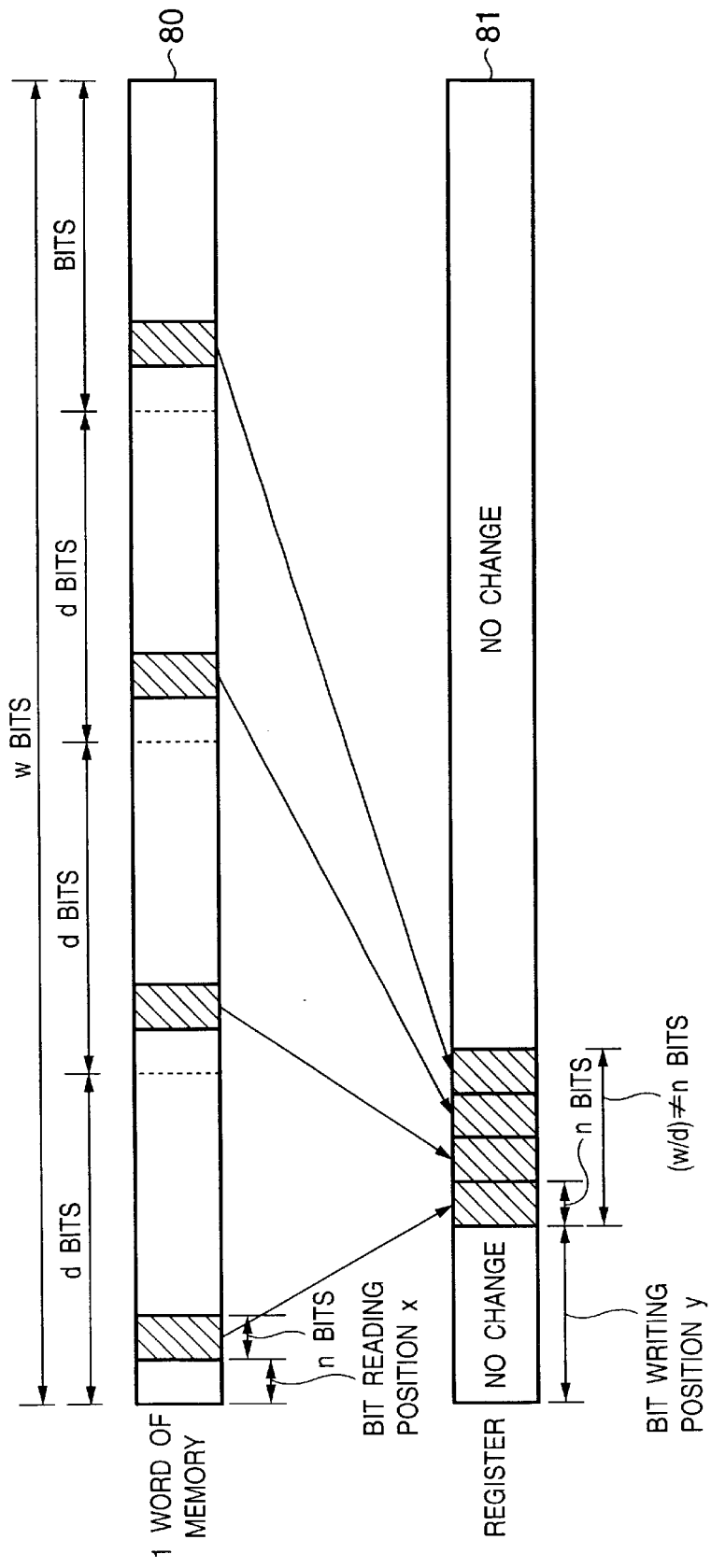
FIG. 8 is an explanatory view of bits read from a memory to a register by execution of the bit selection load instruction.

FIG. 8 shows bits read from a memory to a register by execution of the bit selection load instruction, according to the present embodiment. In the figure, respectively d-bit multivalue data are continuously stored on a memory 80, and the word width of the processor is w bits.

By the bit selection load instruction, first, w-bit data for 1 word are read from a designated address position of the memory 80. Then respective n (=1) bit is selected from respective multivalue data included in the w bits, then total w/d×n=w/d×1=w/d bits are collected, and written into a register 81. In FIG. 8, hatched portions indicate the selected bits.

In the register 81, values other than those in positions where the selected bits are written are not changed by execution of the bit selection load instruction but remain the same.

On the memory 80, a bit plane to be selected from the respective d-bit multivalue data is designated by a bit reading position x ($0 \leq x < d$). Further, in the register 81, a bit position where the selected bit is written is selected by a bit writing position y ($0 \leq y < w$).

The positions x and y are given as operands to the bit selection load instruction. Assuming that mnemonic code of the bit selection load instruction is BLOAD, the positions are expressed in assembler description in format, BLOAD dr, [sr+offset], #x, #y or the like. Note that "sr" means an address base register to designate a load address on the memory 80, and the sum between the content of "sr" and "offset" becomes the load address.

"dr" means a load destination register. "#x" means an immediate operand to designate a bit reading position on the memory, and "#y", an immediate operand to designate a bit writing position to the register. The designation of the positions x and y by immediate operands is made only as an example, and other addressing methods such as register operands may be used.

The assembler code of the processing in FIG. 7 using the above assembler description is as follows. In the code, "r1" means a load address on the memory 80, and "r0", a register in which a load result is stored.

BLOAD r0, [r1], #0, #0
BLOAD r0, [r1+4], #0, #4
BLOAD r0, [r1+8], #0, #8
BLOAD r0, [r1+12], #0, #12

In this example, the w bits of word width and d bits of multivalue data bit width are fixed, however, the instruction can be defined and realized such that these values are variable. In such case, the values w and d are given as operands of the bit selection load instruction, otherwise, multiple number of bit selection load instructions may be defined in correspondence with different w and d values.

Further, in the present embodiment, to read one bit plane, n (=1) bit is selected from d-bit multivalue data, however, the embodiment can be expanded to selection of plural bits (n>1) from the respective multivalue data.

Figure 9:
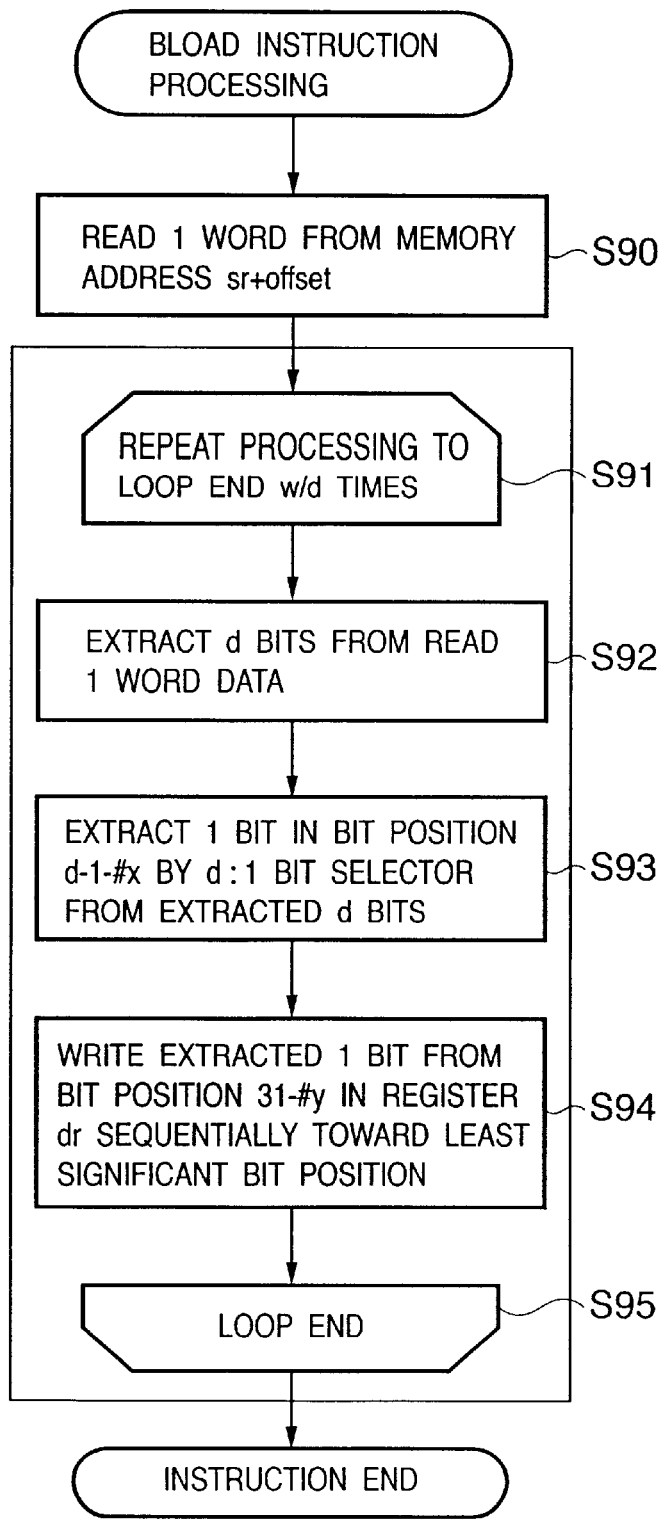
FIG. 9 is a flowchart showing BLOAD instruction processing.

Next, the flow of BLOAD instruction processing will be described with reference to the flowchart of FIG. 9. FIG. 9 shows processing upon execution of instruction, BLOAD dr, [sr+offset], #x, #y in the above description (n=1 holds).

First, at step S90, calculation of sr+offset is performed, and data for 1 word is read from the memory address sr+offset.

Next, at steps S91 to S95, processing to read necessary bits from 1-word data is performed. Step S91 is a step to start a bit reading processing loop, and step S95, a step of loop end. The loop is repeated by the number obtained by dividing 1-word bit width (w bits) by a multivalue data bit width (d bits).

In the loop, at the first step S92, d bits corresponding to 1 multivalue data are read from 1 word read from the memory. Next, at step S93, a bit designated by a bit position #x as an operand of the BLOAD instruction is selected from the d bits by using a d-to-1 bit selector. In this example, as the bit position #x is counted from the most significant bit of the d bits, 1 bit in a bit position (d-1-x) is extracted. Next, at step S94, the 1 bit extracted at step S93 is written sequentially from a bit position (31-#y) of the destination register dr, while the bit position is shifted toward the least significant bit (bit position 0 corresponds to the least significant bit). That is, in the initial loop, writing is made in the bit position (31-#y) of the register dr, then in the next loop, writing is made in a bit position (31-#y-1), and thereafter, in each of the subsequent loops, writing is made by shifting the bit position toward the least significant bit.

When the loop processing has been repeated a predetermined number of times, the writing of selected bit to the register dr is completed, and the BLOAD instruction ends.

Note that in the flowchart, 1 bit is selected and written in 1 loop at steps S91 to S95, however, this is a logical description. When the processing is realized by hardware, plural bits may be selected and written at once by providing multiple number of bit selectors at step S93. If w/d bit selectors operate in parallel, the processing in the loop can be completed at once.

[Fourth Embodiment]

As a supplementary explanation of the operations of the above-described embodiments, the JPEG 2000 coding processing will be described below.

Figure 10:
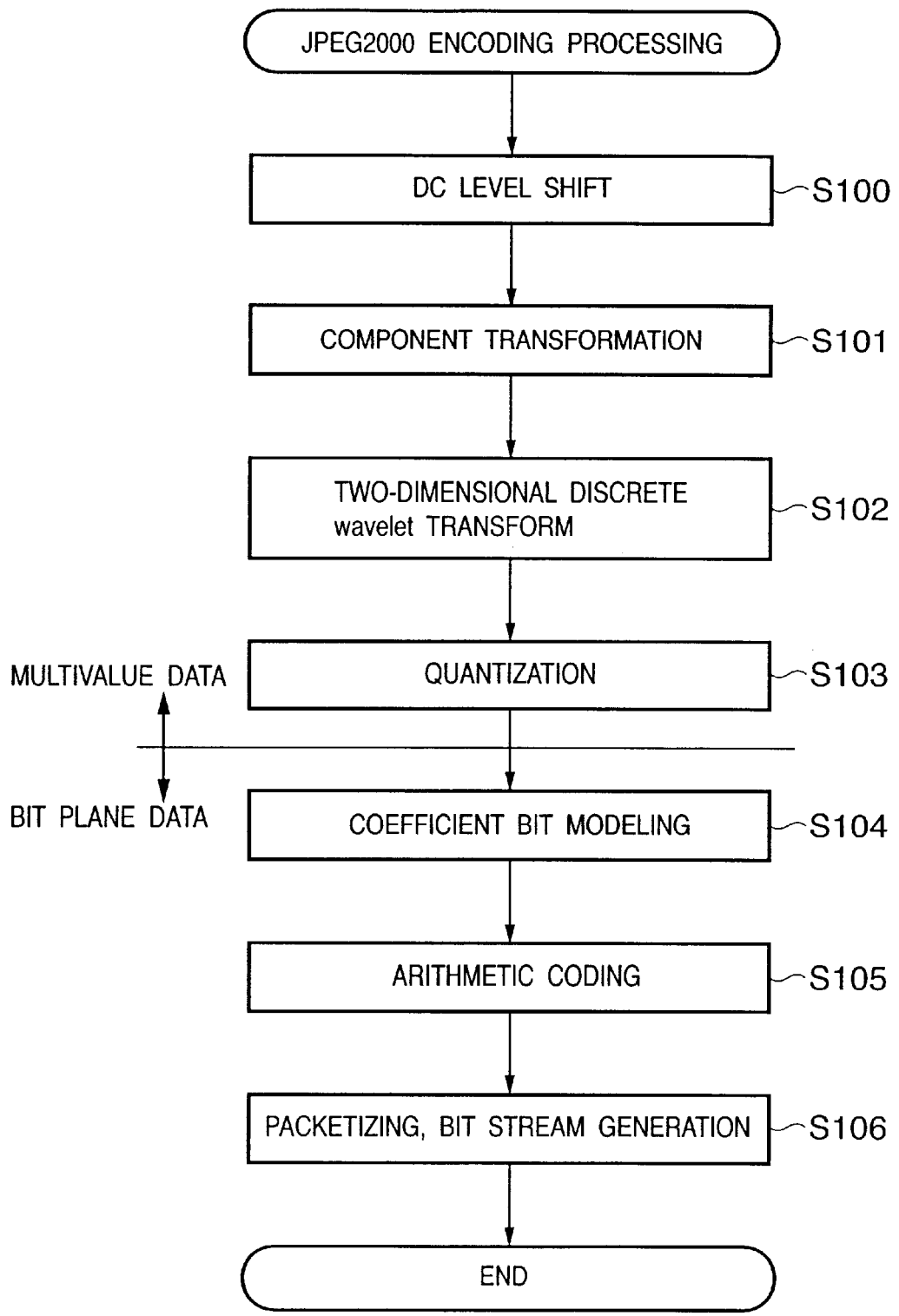
FIG. 10 is a flowchart showing JPEG 2000 coding processing.

FIG. 10 is a flowchart showing the entire JPEG 2000 coding processing. At step S100, DC level shift processing is performed. If a pixel value of input image is represented as an unsigned value, a constant is subtracted from the pixel value, thereby the pixel value is converted to a signed value. If the pixel value is represented as a signed value, the processing at this step is not performed.

Next, at step S101, component transformation processing is performed to convert three color component values by three-dimensional constant matrix multiplication processing. The processing corresponds to conversion of RGB color representation to YUV color representation, and the processing enables efficient compression by changing color component value distribution. As the processing at step S101 is optional, it may be performed or omitted upon coding processing.

Next, at step S102, two-dimensional discrete wavelet transform (DWT) is performed on the pixel value. First, a one-dimensional DWT will be described. In the JPEG 2000 system, a 5-3 reversible filter and a 9-7 irreversible filter are defined, and one of the filters is used in the transform. Here the 5-3 reversible filter is used for the sake of simplification of the explanation. Assuming that an input value to the one-dimensional DWT is X(n) (n=0, 1, . . . , N−1), and an output value, Y(n) (n=0, 1, . . . , N−1), the processing by the 5-3 reversible filter is represented in the following two-step expression.

$$Y(2n+1)=X(2n+1)-[X(2n)+X(2n+2)]/2$$

$$Y(2n)=X(2n)-[Y(2n-1)+Y(2n+1)+2]/4$$

"[x]" represents a maximum integer not greater than "x". If the range of "n" of the input value "X(n)" exceeds the initial range "0 to (N−1)", the range defining the value "X(n)" is expanded by a predetermined method in the standard before the range is used. "Y(2n)" corresponds to a coefficient of low frequency (L) component, and "Y(2n+1)", a coefficient of high frequency (H) component.

In use of the 9-7 irreversible filter, the expression has 6 steps, and the coefficient values in the expression are different, that is, the expression is more complicated, however, the basic calculation in each step is the same. In any filter, N output values are generated from N input values, and among the output values, an even-numbered N/2 value corresponds to a low frequency (L) component, and an odd-numbered N/2 value, a high frequency (H) component.

Figure 11:
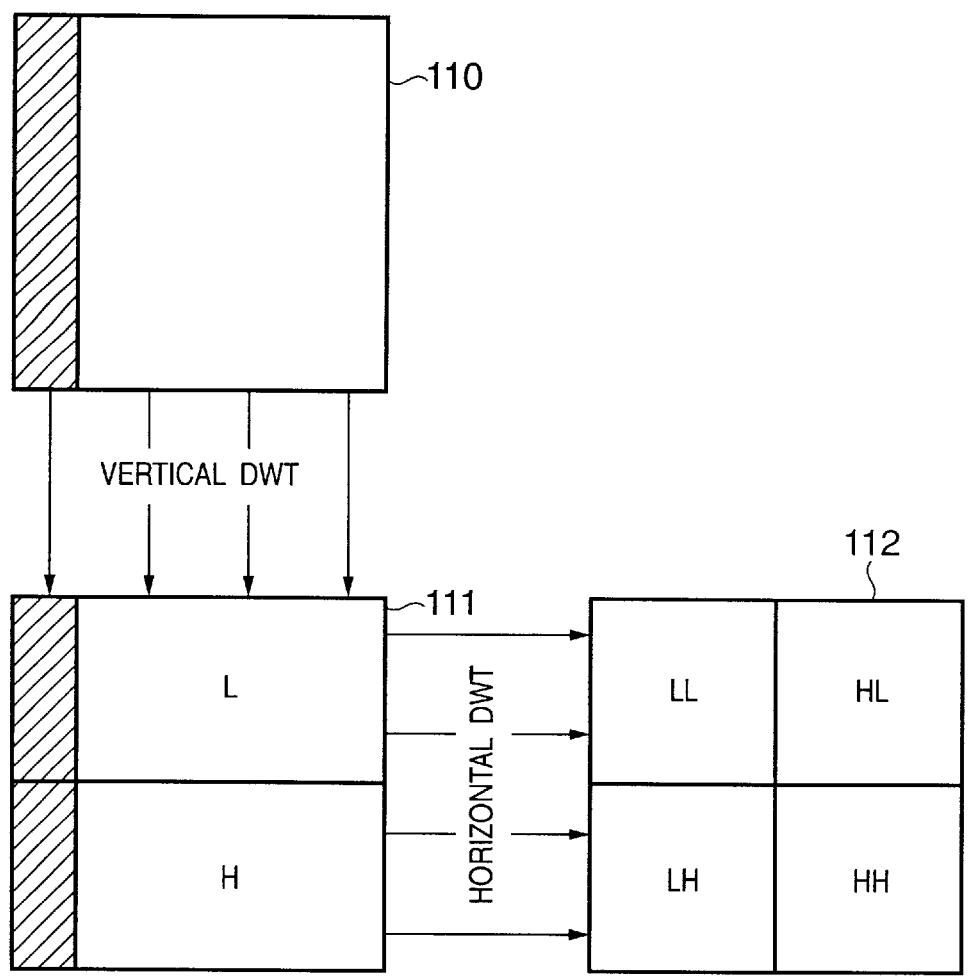
FIG. 11 is an explanatory view of two-dimensional DWT processing.

Next, the two-dimensional DWT processing will be described with reference to FIG. 11. In FIG. 11, first, a vertical one-dimensional DWT processing is performed on a two-dimensional input pixels (pixel group) 110 by each column. Low-frequency (L) side outputs and high-frequency (H) side outputs are collected respectively as coefficient values 111 after the vertical DWT. Next, horizontal one-dimensional DWT processing is performed on the coefficient values 111 by each row. Similarly, L-side and H-side output coefficients are collected as output coefficient values 112 after two-dimensional DWT. In the output 112, a part as a collection of horizontal and vertical L-side components is an LL subband; a part as a collection of vertical H components and horizontal L components, an HL subband; a part as a collection of vertical L components and horizontal H components, an LH subband; and a part as a collection of vertical and horizontal H-side components, an HH subband. Generally, the LL subband is further subjected to the two-dimensional DWT thereby further divided into finer subbands.

At step S103, quantization processing is performed on the coefficients of the respective subbands. Assuming that an input coefficient value is x, and a quantization step, Δ, a quantized coefficient value q is obtained as:

$$q=\text{sign}(x)\times[abs(x)/\Delta]$$

Note that "sign(x)" is a sign of x, which returns "−1" when x<0 holds, and returns "1" when x>0 holds, and "abs(x)" returns an absolute value of x. "[x]" is a maximum integer not greater than "x". The quantization step Δ is a constant value per subband.

Note that steps S101 to S103, the pixel and coefficient values are often represented as 2's complement numbers for the sake of calculation, however, from S103 to S104, it is necessary to process a coefficient's sign and absolute value separately, the representation of coefficient value is converted to sign and absolute form in which a sign is represented by 1 bit and an absolute value is represented by remaining bits.

At step S104, coefficient bit modeling processing is performed. The processing at steps S102 and S103 is performed on subbands, while the processing at step S104 is performed on code blocks obtained by further dividing the subbands.

Figure 12:
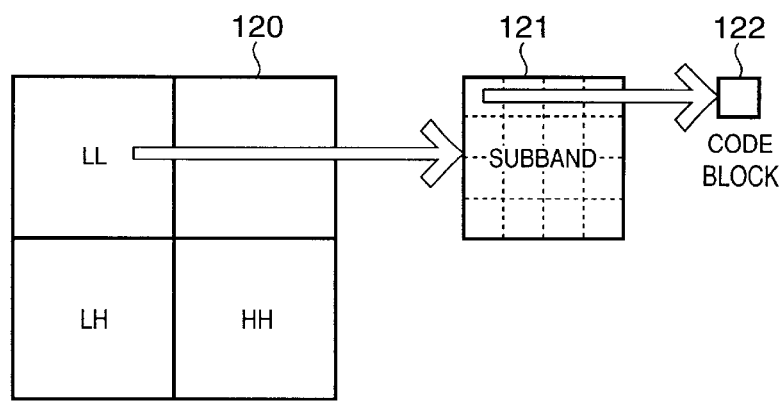
FIG. 12 is an explanatory view of relation among image coefficient data 120, a subband 121 and a code block 122 after the two-dimensional DWT processing.

FIG. 12 shows the relation among an image coefficient data 120, a subband 121 and a code block 122 after the two-dimensional DWT. Among the coefficient data after the two-dimensional DWT (step S102), one subband 121 is extracted and quantized (step S103), and the subband 121 is further divided into code blocks. Each code block (122) is processed at step S104.

Further, in FIG. 10, at steps S101 to S103, the pixel and coefficient values are handled as multivalue data, however, at step S104, multivalue data is divided into bit planes and processing is performed on bit plane data. Accordingly, the above-described embodiments are applied to data input at step S104.

Figure 13:
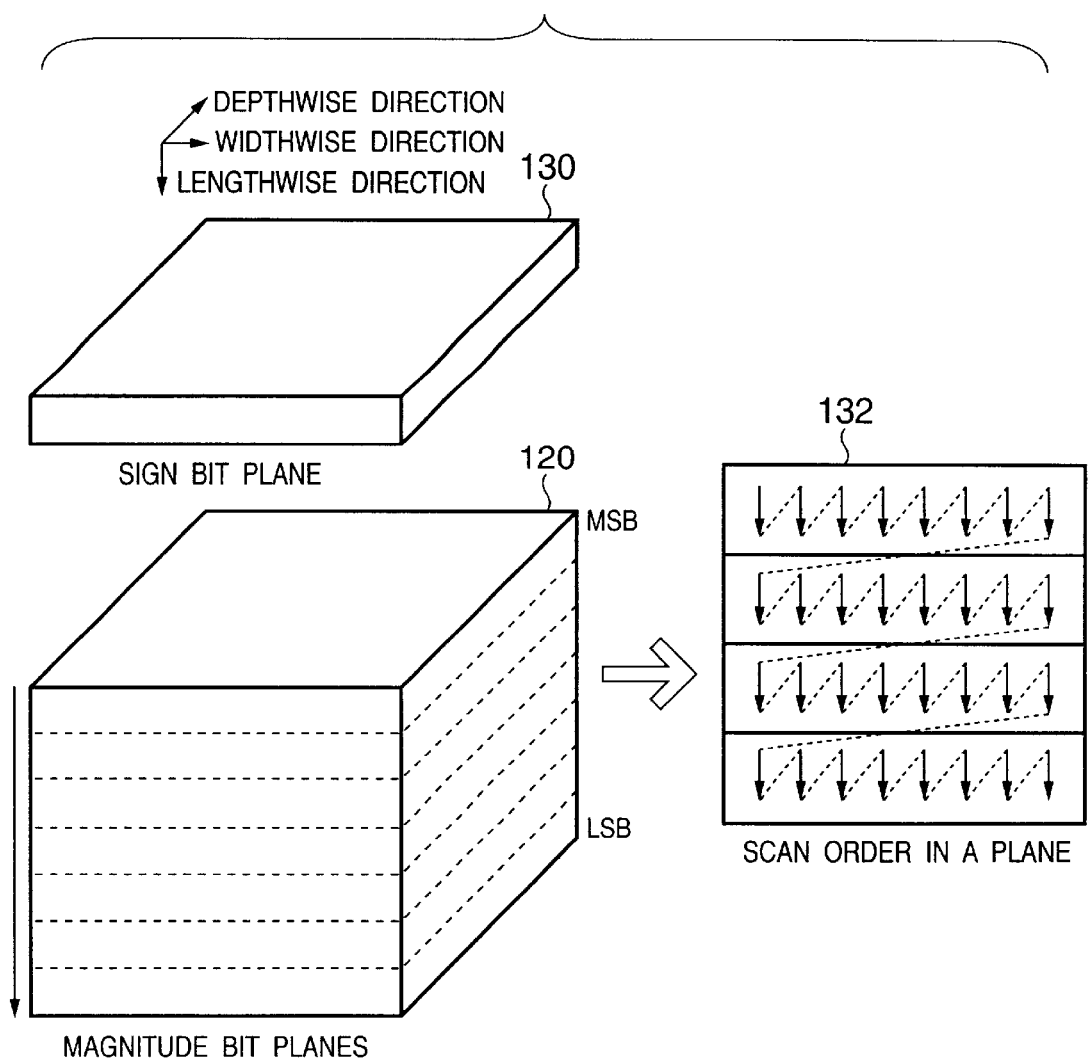
FIG. 13 is an explanatory view of the order of data input processing at step S104 in FIG. 10.

The data input processing order at step S104 will be described with reference to FIG. 13. The left side part of FIG. 13 shows code block multivalue data (sign and absolute value form). In the figure, the widthwise direction and depthwise direction of the data indicate spatial size of code block, and the lengthwise direction, a bit depth of multivalue data. Numeral 130 denotes a bit plane only comprising a coefficient sign bit; 131, bit planes indicating a coefficient's absolute value, divided into bit-depth bit planes along dotted lines. Assuming that absolute value bits are arranged from the top (MSB) to the bottom (LSB), the absolute value bit plane 131 is processed from the MSB toward the LSB. The sign bit plane 130 is referred to in the course of processing of the absolute value bit planes 131, and the sign bit is also processed on a condition.

The right side part of FIG. 13 shows the order of bit processing in a bit plane 132 extracted from the absolute value bit planes 131. The bit plane 132 is divided by vertical 4 bits, and processed in accordance with the direction indicated by arrows in the right part of the figure. Each vertical small arrow represents vertical 4 bits, and when the vertical 4 bits have been processed, the next right-hand 4 bits are processed from the top to the bottom. When the processing reaches the right end, the processing moves to the next 4 bits in the next row. Thereafter, the scan is performed 3 times within one bit plane until the bit plane data corresponding to all the code block have been processed, since processed bits and unprocessed bits exist in each scan and all the bits must be processed by repeating the scan. The conditions for selection of bits to be processed in each scan are defined in the standard.

Figure 14:
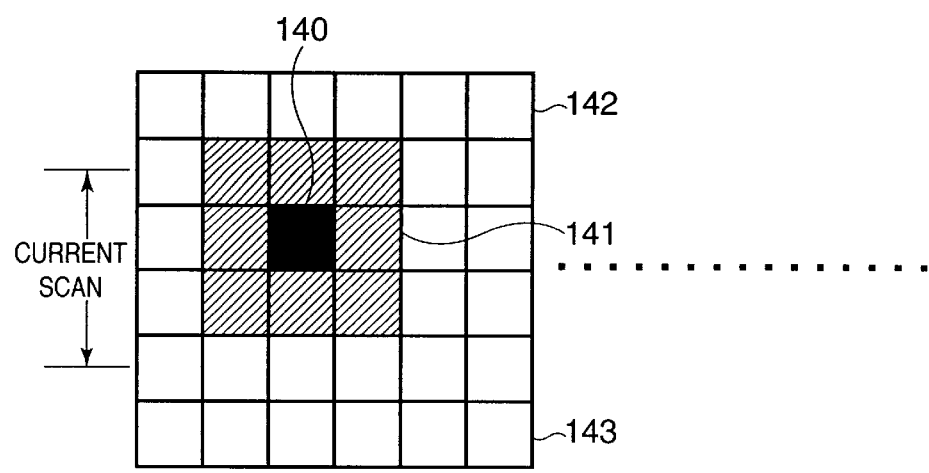
FIG. 14 is an explanatory view of coefficient bit 140 to be encoded and neighboring 8 coefficient bits 141 (hatched portions)

At step S104, context to be used in the next arithmetic coding processing (step S105) and coded bit values are calculated while the coefficient bits are scanned in the order as shown in FIG. 13. As shown in FIG. 14, bit values of a coefficient bit 140 to be encoded and neighboring 8 coefficient bits 141 (hatched portions) and statuses calculated accompanying the bit values are used in the calculation. In FIG. 14, assuming that a central 4 rows are the array of currently-processed vertical 4 bits, a row 142 belongs to a previous vertical 4 bits and a row 143 belongs to a subsequent 4 bits. As neighboring 8 bits of the pixel of interest are required, values and status information of coefficient bits 142 and 143 are necessary for processing of the current vertical 4 bits. The context and coded bit values are calculated by referring to these many bit information, and forwarded to the next arithmetic coding step 105.

In FIG. 10, in the arithmetic coding processing at step S105, context-base arithmetic coding is performed with the context and the coded bit values calculated at step S104 as input, thereby the data amount of the coefficient data is compressed.

Next, at step S106, the data compressed at step S105 is packetized in appropriate units, then necessary header segments are added to the packet, thus an output bit stream is generated.

By the above processing, the JPEG 2000 coding processing is completed. Note that the decoding processing is realized by performing the conversion in the respective steps in FIG. 10 in reverse order. In the procedure of the JPEG 2000 coding in FIG. 10, the above-described embodiments are applied to the coefficient bit modeling processing at step S104. As processed data changes from multivalue data to bit plane data from this step, the conversion processing by the above-described embodiments efficiently realizes the processing at step S104.

FIG. 15 shows an example where the above-described embodiments are applied to step S104. In FIG. 15, 4×4 multivalue coefficient data 150 is processed at step S104. For the sake of simplification of explanation, the size of the coefficient data is 4×4, however, actually, the coefficient data has a greater size. As described in FIG. 13, the coefficient data 150 is processed in the order of numbers (0, 1, 2, ..., 15) in the figure, from the most significant bit plane toward the least significant bit plane. Note statuses of the coefficient data on a memory (e.g. main memory 17) on some time points are represented with respectively 1-word memory areas 151 to 154. The memory areas 151 to 154 hold coefficient data 0 to 3, 4 to 7, 8 to 11 and 12 to 15, respectively. Assuming that the most significant bits of the respective multivalue coefficient data are sign bits, hatched portions in the figure corresponds to the sign bits. The sign bits are scattered in the respective memory words. If bits in the sign bit positions are collected from the respective words by the processing according to any of the first to third embodiments, data 155 as a collection of sign bits can be obtained on a local memory or register.

Once the sign bits are collected as data 155, the sign bit value of any of coefficients 0 to 15 can be easily obtained by calculating a logical product (AND) between the bit mask and the data 155, and as shown in FIG. 14, the processing to obtain neighboring pixel data values of coded bit can be efficiently performed. Especially, the bit plane 130 is necessary during the processing of the absolute value bit planes 131 as shown in FIG. 13 accordingly, an arbitrary bit of the data 155 can be efficiently referred to by storing the sign bits as the data 155 as shown in FIG. 15.

As described above, the present invention improves the speed and efficiency in transfer of bit data, especially, bit plane of multivalue data.

The present invention is not limited to the above embodiments and various changes and modifications can be made within the spirit and scope of the present invention. Therefore, to appraise the public of the scope of the present invention, the following claims are made.

What is claimed is:

1. A data processing apparatus having a DMA circuit transferring data from a first memory, in which n x m pixels are stored, to a second memory, said each of pixels being represented by a plurality of bits, the DMA circuit comprising:

a loading unit adapted to load pixel data, in a unit of predetermined number of pixels, from the first memory;

a buffer unit adapted to extract bits at the same bit position of each of pixel data, and to store by packing the extracted bits for the same bit position; and a transfer unit adapted to transfer each of packed bits stored in the buffer unit after the n×m pixels data are loaded by said loading unit, to the second memory.

2. The data processing apparatus according to claim 1, wherein the apparatus executes coding processing of the packed bits stored in the second memory in a unit of predetermined number of bits.

3. The data processing apparatus according to claim 2, wherein the coding processing is included in JPEG 2000 coding processing.

4. The data processing apparatus according to claim 1, wherein the loading unit loads pixel data in a unit of 4 pixels, each of pixels being represented by 8 bits, and wherein the transferring unit transfers packed 32-bit bit-plane data stored in the buffer unit, to the second memory.

5. A data processing apparatus having a DMA circuit transferring data from a first memory, in which a plurality of bit-plane data consisting of bits of the same bit position of a plurality of multivalued pixels are stored, to a second memory, the DMA circuit comprising:

a loading unit adapted to load bit-plane data, in a unit of predetermined number of planes, from the first memory;

a buffer unit adapted to extract bits at the same bit position of each of plane data loaded by said loading unit, and to store by packing the extracted bits for the same bit position; and a transferring unit adapted to transfer each of packed bits stored in the buffer unit after all bit-plane data are loaded by said loading unit, to the second memory.

6. The data processing apparatus according to claim 5, wherein the loading unit loads bit-plane data in a unit of 2 bit-plane, each of bit-plane being represented by 16 bits, and wherein the transferring unit transfers packed 32-bit pixel data stored in the buffer unit, to the second memory.

7. The data processing apparatus according to claim 5, wherein the apparatus executed decoding processing of the packed bits stored in th second memory in a unit of predetermined bits.

8. A data processing method having a DMA circuit transferring data from a first memory, in which n×m pixels are stored, to a second memory, said each of pixels being represented by a plurality of bits, said method comprising the steps of:

loading pixel data, in a unit of predetermined number of pixels, from the first memory;

extracting bits at the same bit position of each of pixel data, and storing the extracted bits for the same bit position by packing; and transferring each of packed bits stored after the n×m pixels data are loaded in said loading step, to the second memory.

9. A data processing method having a DMA circuit transferring data from a first memory, in which a plurality of bit-plane data consisting of bits of the same bit position of a plurality of multivalued pixels are stored, to a second memory, the method comprising the steps of:

loading bit-plane data, in a unit of predetermined number of planes, from the first memory;

extracting bits at the same bit position of each of plane data loaded in said loading step, and storing the extracted bits for the same bit position by packing; and transferring each of packed bits stored after all bit-plane data are loaded in said loading step, to the second memory.

* * * * *

UNITED STATES PATENT AND TRADEMARK OFFICE
CERTIFICATE OF CORRECTION

PATENT NO. : 6,938,105 B2 Page 1 of 1
APPLICATION NO. : 09/983101
DATED : August 30, 2005
INVENTOR(S) : Osa It is certified that error appears in the above-identified patent and that said Letters Patent is hereby corrected as shown below:

COLUMN 2:
Line 56, "oading" should read -- loading --.

COLUMN 3:
Line 49, "embodiment" should read -- embodiments --.

COLUMN 7:
Line 21, "resister 74." should read -- register 74. --.

COLUMN 13:
Line 3, "th" should read -- the --.

Signed and Sealed this

Twenty-ninth Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,938,105 B2  
APPLICATION NO. : 09/983101  
DATED : August 30, 2005  
INVENTOR(S) : Kinya Osa Page 1 of 1

It is certified that error appears in the above-identified patent and that said Letters Patent is hereby corrected as shown below:

On the title page (*) Notice, change "421 days" to --596 days--.

Signed and Sealed this

Fifth Day of June, 2007

JON W. DUDAS  
*Director of the United States Patent and Trademark Office*